United States Patent
Aso

(10) Patent No.: US 9,764,397 B2
(45) Date of Patent: Sep. 19, 2017

(54) INDEXABLE ROTARY CUTTING TOOL

(71) Applicant: TUNGALOY CORPORATION, Iwaki-shi, Fukushima (JP)

(72) Inventor: Takahiro Aso, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 0 days.

(21) Appl. No.: 15/120,661

(22) PCT Filed: Feb. 25, 2015

(86) PCT No.: PCT/JP2015/055478
§ 371 (c)(1),
(2) Date: Aug. 22, 2016

(87) PCT Pub. No.: WO2015/129768
PCT Pub. Date: Sep. 3, 2015

(65) Prior Publication Data
US 2017/0014918 A1    Jan. 19, 2017

(30) Foreign Application Priority Data
Feb. 26, 2014 (JP) ................................. 2014-034758

(51) Int. Cl.
*B23C 5/10* (2006.01)
*B23C 5/22* (2006.01)

(52) U.S. Cl.
CPC ............ *B23C 5/109* (2013.01); *B23C 5/2221* (2013.01); *B23C 2200/0411* (2013.01);
(Continued)

(58) Field of Classification Search
CPC ..... B23C 2200/0411; B23C 2200/0477; B23C 2200/165; B23C 2210/168;
(Continued)

(56) References Cited

U.S. PATENT DOCUMENTS 4,714,383 A * 12/1987 Shimomura .............. B23C 5/08
407/113
4,729,697 A *  3/1988 Lacey ................... B23C 5/2213
407/114

(Continued)

FOREIGN PATENT DOCUMENTS

EP      0620070 A1    10/1994
EP      3088112 A1    11/2016

(Continued)

OTHER PUBLICATIONS

International Search Report dated May 26, 2015 issued in counterpart International (PCT) Application (No. PCT/JP2015/055478).
(Continued)

*Primary Examiner* — Daniel Howell
*Assistant Examiner* — Nicole N Ramos
(74) *Attorney, Agent, or Firm* — Womble Carlyle

(57) ABSTRACT

The present invention provides a tool body (20) for use in an indexable rotary cutting tool, the tool body (20) having a rotational axis and a substantially cylindrical shape. Spiral grooves (28) are formed so as to extend from a base end side of the tool body to a leading end side in a peripheral surface (23) of the tool body. The spiral grooves (28) each have a plurality of insert seats (30) formed so as to be shifted from each other from the base end side toward the leading end side. The insert seats (30) each have a bottom surface (31) and first and second side surfaces (32, 33) that extend so as to intersect with the bottom surface (31). The first side surface (32) faces the base end side of the tool body (20), and the second side surface (33) faces the leading end side of the tool body (20) and is located on the base end side with respect to the first side surface (32). In at least one insert seat (30) located closer to the base end side with respect to an insert seat (30) located closest to the leading end side of the (Continued)

tool body (20), a length (L1) of the first side surface (32) is longer than a length (L2) of the second side surface (33).

17 Claims, 14 Drawing Sheets

(52) U.S. Cl.
CPC .......... *B23C 2200/0477* (2013.01); *B23C 2210/168* (2013.01); *B23C 2220/60* (2013.01); *B23C 2265/40* (2013.01); *Y10T 407/192* (2015.01); *Y10T 407/1924* (2015.01)

(58) Field of Classification Search
CPC . B23C 2220/60; B23C 2265/40; B23C 5/109; B23C 5/2221; B23C 5/003; B23C 5/2208; B23C 5/006; Y10T 407/1948; Y10T 407/1936; Y10T 407/1934
See application file for complete search history.

(56) References Cited

U.S. PATENT DOCUMENTS

| | | | |
|---|---|---|---|
| 5,190,419 A | 3/1993 | Lindberg et al. | |
| 5,944,456 A * | 8/1999 | Shirley | B23C 5/109 407/42 |
| 6,659,694 B1 * | 12/2003 | Asbell | B23C 5/04 407/40 |
| 6,773,209 B2 * | 8/2004 | Craig | B23C 5/109 407/113 |
| 7,645,100 B2 * | 1/2010 | Andersson | B23B 27/065 407/113 |
| 2003/0223829 A1 * | 12/2003 | Craig | B23C 5/109 407/40 |
| 2007/0292219 A1 | 12/2007 | Craig | |
| 2010/0047026 A1 | 2/2010 | Horiike et al. | |
| 2013/0039705 A1 | 2/2013 | Fang et al. | |

FOREIGN PATENT DOCUMENTS

| | | |
|---|---|---|
| JP | H01-037857 Y | 11/1989 |
| JP | 2011-121132 A | 6/2011 |
| WO | WO 2008/032778 A1 | 3/2008 |

OTHER PUBLICATIONS

Written Opinion dated May 26, 2015 issued in counterpart International (PCT) Application (No. PCT/JP2015/055478).

* cited by examiner

INDEXABLE ROTARY CUTTING TOOL

RELATED APPLICATIONS

This is a 371 US National Phase of International Patent Application No. PCT/JP2015/055478 filed Feb. 25, 2015 and published as WO 2015/129768A1 on Sep. 3, 2015, which claims priority to JP 2014-034758, filed Feb. 26, 2014. The contents of the aforementioned applications are incorporated by reference in their entirety.

TECHNICAL FIELD

The present invention relates to an indexable rotary cutting tool. More specifically, the present invention relates to a roughing end mill on which a plurality of cutting inserts is removably mounted.

BACKGROUND ART

Conventionally, there has been a roughing end mill on which a plurality of cutting inserts is removably mounted, as one type of indexable rotary cutting tool for the purpose of providing highly-efficient work. This tool has a cylindrical tool body that is provided with a plurality of grooves extending from its base end side toward its leading end side in a peripheral surface of the tool body and a plurality of cutting inserts is removably mounted along the grooves. Since the plurality of inserts arranged in a direction of a rotational axis of the tool body is involved in cutting in such roughing end mill, the depth of cut provided by the tool is significantly large. Accordingly, by feeding the tool in a horizontal direction relative to a workpiece while maintaining such a large depth of cut, a highly-efficient cutting process can be performed.

As one example of such roughing end mills, Patent Document 1 discloses a type of roughing end mill which uses cutting inserts having a triangular shape in a planar view. The cutting inserts used in Patent Document 1 are of a positive type and each cutting insert has three corners that can be used for cutting. In addition, the cutting inserts are not arranged so as to be overlapped with each other in a direction along a tool rotational axis in one groove, and the cutting inserts are arranged at regular intervals.

CITATION LIST

Patent Document

Patent Document 1: Japanese Examined Utility Model Application Publication No. H01-037857

SUMMARY

Technical Problem

Recently, there has been an increasing demand for further improving the efficiency of a cutting process using a roughing end mill and, in order to satisfy such demand, cutting conditions have become increasingly strict, such as with regard to the increased number of rotations per unit time. However, the indexable roughing end mill of Patent Document 1 has a problem in its chip discharging performance under such strict cutting conditions. Specifically, when the roughing end mill of Patent Document 1 performs cutting under strict cutting conditions, the chips cannot be discharged through grooves sufficiently rapidly and the grooves get clogged with the chips or the chips get caught in between the cutting inserts and the workpiece.

The present invention has been made in light of the above problem and an object of the present invention is to enhance the discharging efficiency of chips under strict cutting conditions set for highly efficient cutting in an indexable rotary cutting tool.

Solution to Problem

The present invention provides a substantially cylindrical tool body 20 having a rotational axis, the tool body 20 comprising: a plurality of spiral grooves 28 formed so as to extend from a base end side of the tool body to a leading end side in a peripheral surface 23 of the tool body 20; and a plurality of insert seats 30 formed in the spiral grooves such that the insert seats are shifted from each other from the base end side toward the leading end side. The insert seats 30 each have a bottom surface 31, a first side surface 32 that intersects with the bottom surface 31 and faces the base end side of the tool body 20, and a second side surface 33 that intersects with the bottom surface and faces the leading end side of the tool body 20, the second side surface 33 being located on the base end side with respect to the first side surface 32. In at least one insert seat 30 located closer to the base end side with respect to an insert seat 30 located closest to the leading end side of the tool body 20, a length L1 of the first side surface 32 is longer than a length L2 of the second side surface 33.

The present invention also provides an indexable rotary cutting tool 10, wherein cutting inserts 40 are removably mounted on the respective insert seats 30 of the above-mentioned tool body 20.

According to the present invention, from among a plurality of insert seats in a common spiral groove, by configuring an insert seat in a front segment such that the length of its second side surface is shorter than the length of its first side surface, chips generated by a cutting insert in a segment located immediately rear side (a segment located on the base end side of the tool body) of such front segment can be smoothly discharged without being impeded by the insert seat in the front segment. Accordingly, it is possible to significantly suppress the chip clogging or the chips being caught in between the cutting inserts and the workpiece.

DESCRIPTION OF EMBODIMENTS

Embodiments of the present invention will now be described with reference to the attached drawings.

Figure 1:
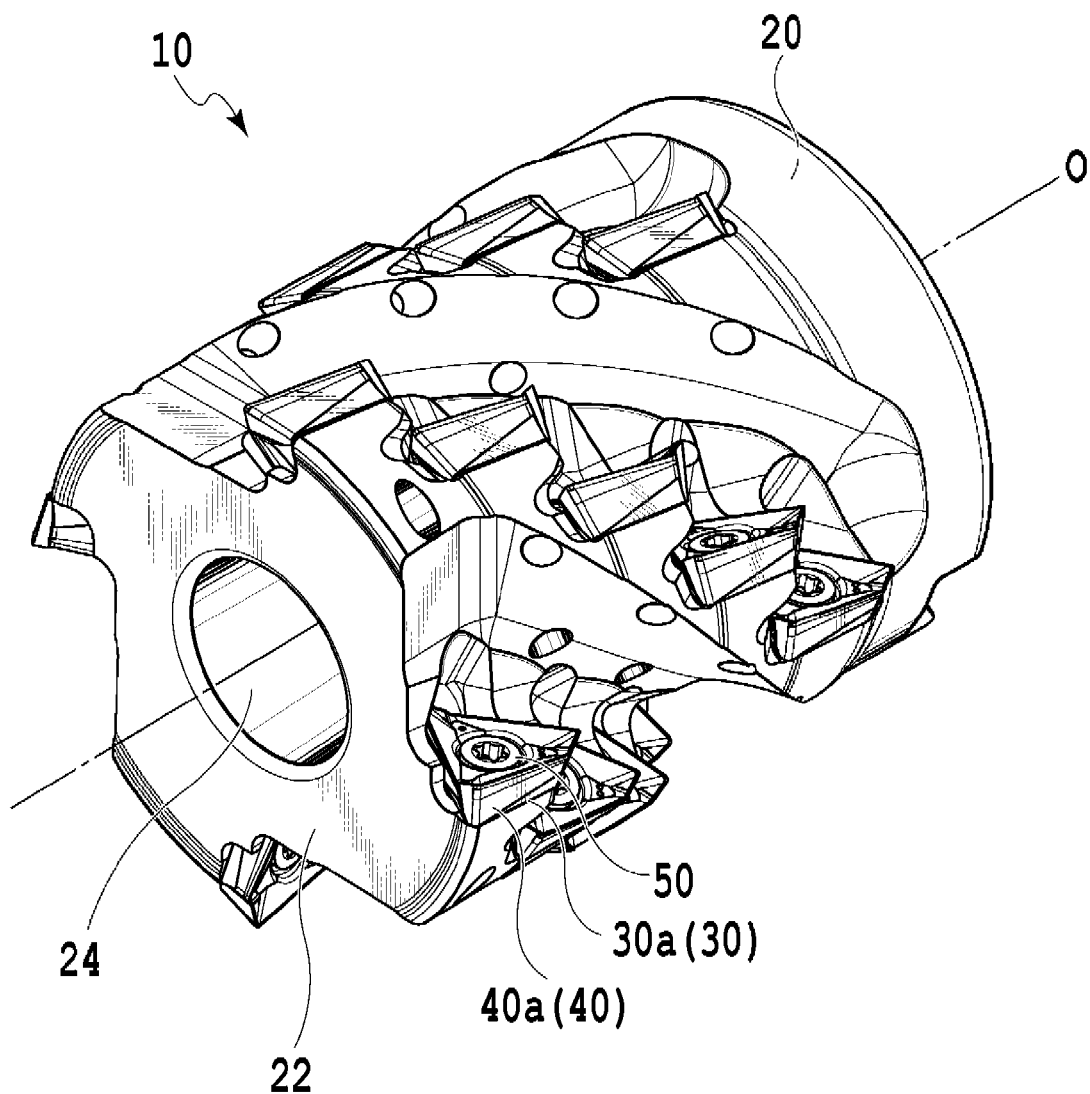
FIG. 1 is a perspective view showing an embodiment of an indexable rotary cutting tool according to the present invention, as viewed from a leading end side.

An indexable rotary cutting tool 10 according to the present embodiment is basically constituted by: a substantially cylindrical tool body 20 having a plurality of insert seats 30; and a plurality of cutting inserts 40 mounted on the insert seats 30, as shown in FIG. 1.

As shown in FIGS. 2, 3A, 3B and 7, the tool body 20 has a substantially cylindrical shape including a substantially circular first end surface 21, a second end surface 22 arranged so as to oppose the first end surface 21 and having a substantially circular shape similarly to the first end surface 21, and the peripheral surface 23 connecting these end surfaces. The tool body 20 has a rotational axis O passing through a center point of the first end surface 21 and a center point of the second end surface 22. The indexable rotary cutting tool 10 rotates with respect to the rotational axis O. The first end surface 21 is an end surface arranged at a base end side of the tool body 20 and will also be referred to as a "base end surface." Herein, the base end side of the tool body 20 refers to a side to be attached to a machine tool. The second end surface 22 is an end surface arranged at a leading end side of the tool body 20 and will also be referred to as a "leading end surface." Herein, the leading end side of the tool body 20 refers to a side which is to be brought closer to a workpiece. The tool body 20 is provided with a through hole 24 formed so as to extend from the first end surface 21 to the second end surface 22 along the rotational axis O and a plurality of coolant supply holes 25 through which coolant flows. An attachment bolt to be used for fixing the tool body 20 to an arbor of the machine tool is inserted into the through hole 24. The first end surface 21 is provided with an opening of the through hole 24, openings of the coolant supply holes 25, and a key groove 26 for transferring a motive force from a main shaft of the machine tool. The second end surface 22 is provided with an opening of the through hole 24 and cutouts resulting from the provision of the insert seats 30.

Figure 2:
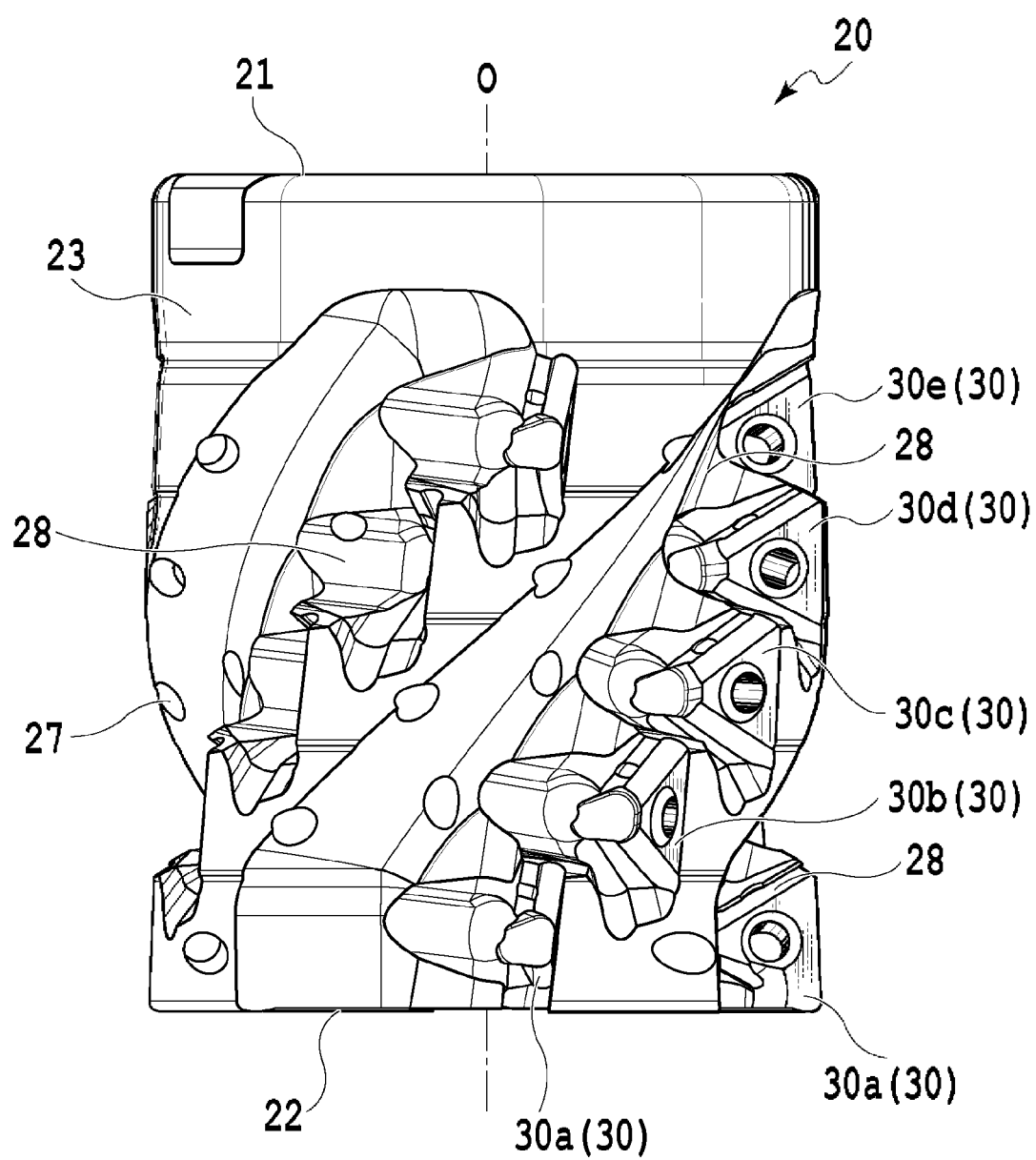
FIG. 2 is a perspective view showing a tool body shown in FIG. 1.
Figure 3A:
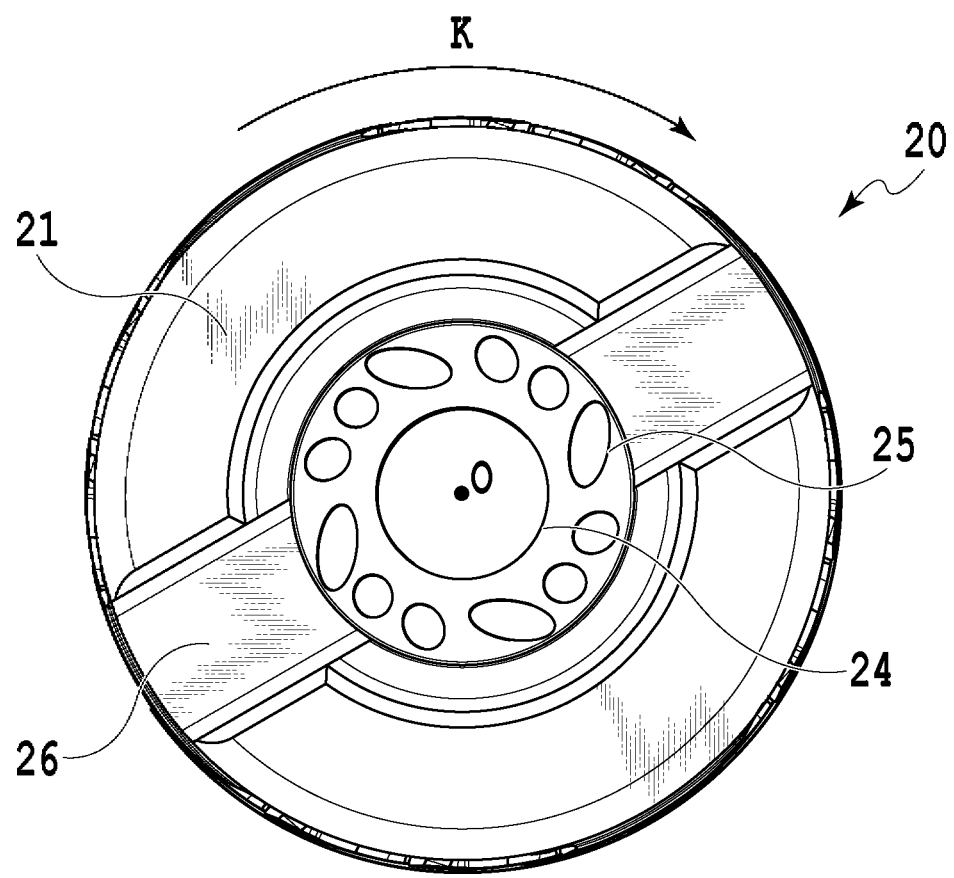
FIG. 3A is a base end view of the tool body shown in FIG. 1.
Figure 3B:
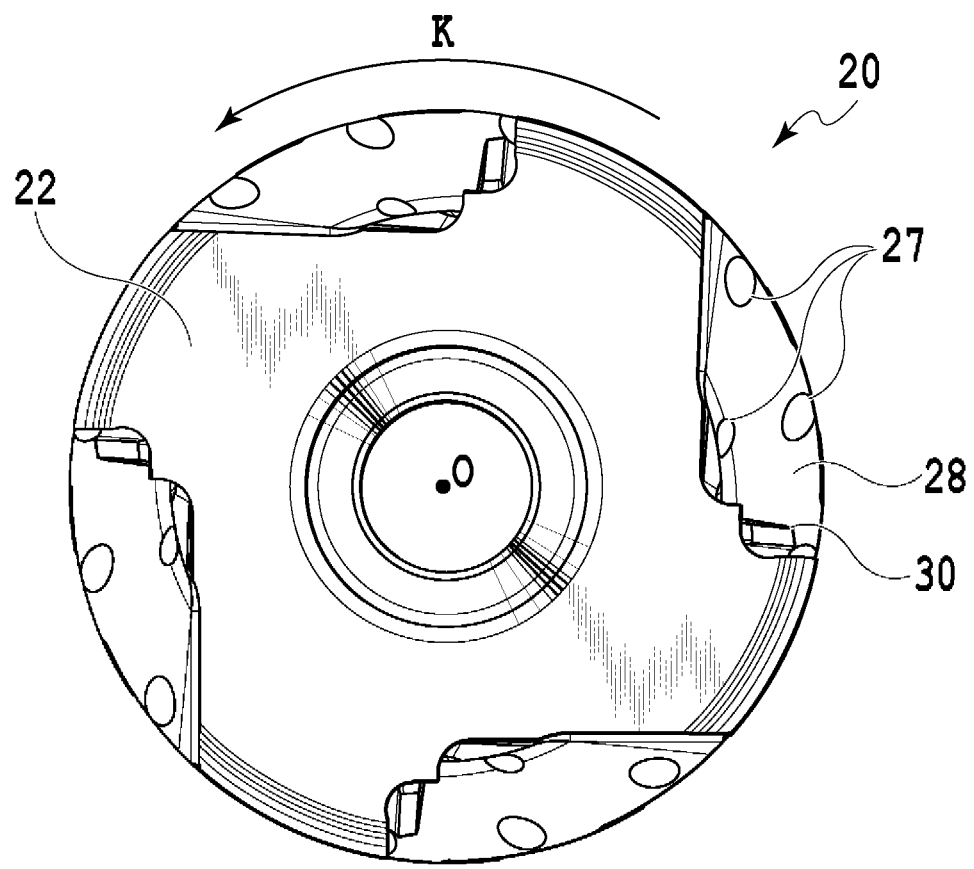
FIG. 3B is a leading end view of the tool body shown in FIG. 1.

A plurality of spiral grooves 28 is formed in the peripheral surface 23 between the first end surface 21 and the second end surface 22 of the tool body 20. The spiral grooves 28 have certain width and depth and are formed so as to be swirled counterclockwise from the base end side toward the leading end side, as viewed from the leading end surface side of the tool body 20. The spiral grooves 28 start near the first end surface 21 of the tool body 20 and reach the second end surface 22. Although four spiral grooves 28 are provided in the present embodiment, the number of spiral grooves 28 is not limited thereto, as long as two or more spiral grooves are provided. As shown in FIG. 3B, the spiral grooves 28 are recessed grooves formed so as to be cut out from the peripheral surface 23. The plurality of insert seats 30 is formed along the spiral grooves 28 in first areas facing forward in a tool rotating direction K in the spiral grooves 28. In other words, the plurality of insert seats 30 is formed in the first areas facing forward in the rotating direction K in the spiral grooves 28. Each insert seat 30 is formed such that a cutting edge portion of an insert 40 to be mounted will be projected radially outward from the peripheral surface along the spiral groove 28. In the present embodiment, although five insert seats 30 are provided in one spiral groove 28, the number of insert seats 30 is not limited thereto, as long as two or more insert seats 30 are provided. As shown in FIGS. 1 to 7, the respective inserts seats 30 are formed in a stair-like manner in the first area extending from a base end toward a leading end of the spiral groove 28. On the other hand, a plurality of coolant ejection ports 27 for ejecting the coolant is provided in second areas facing opposite to the tool rotating direction K in the spiral grooves 28. The coolant ejection ports 27 communicate with the above-mentioned coolant supply holes 25 via coolant passages. The number, arrangement, etc. of the coolant ejection ports 27, coolant passages and coolant supply holes 25 may be changed as appropriate, in accordance with a desired cooling performance, etc.

Herein, in a common spiral groove 28, in a side view of the tool body 20, an insert seat 30a located closest to the leading end side of the tool is defined as an insert seat in a first segment, an insert seat 30b next to the first segment is defined as an insert seat in a second segment, an insert seat 30c next to the second segment is defined as an insert seat in a third segment, an insert seat 30d next to the third segment is defined as an insert seat in a fourth segment, and an uppermost insert seat 30e, i.e., an inset seat 30e located closest to the base end side of the tool is defined as an insert seat in a fifth (uppermost) segment.

Figure 4:
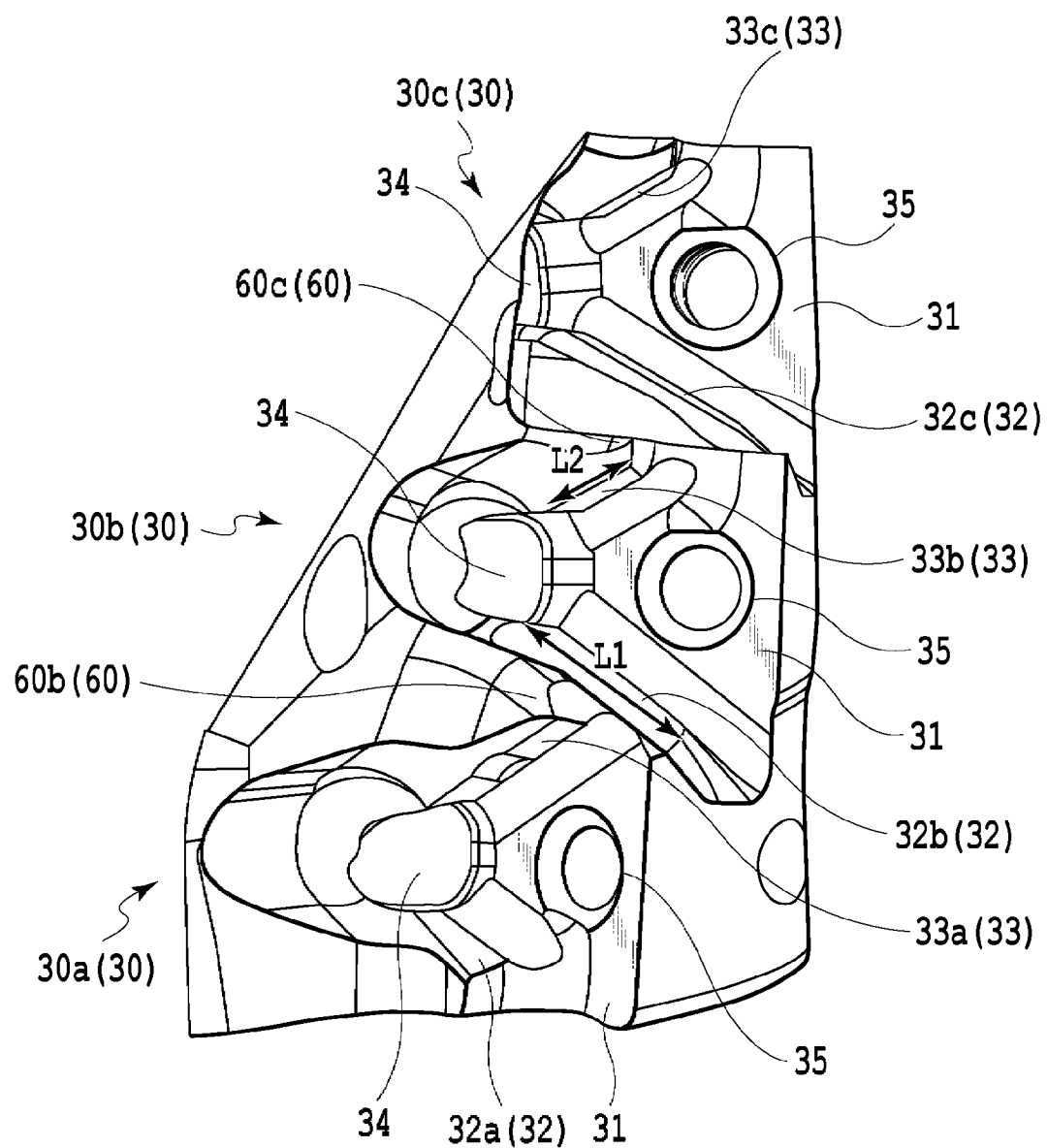
FIG. 4 is a detail view showing insert seats in first to third segments in a common spiral groove.

FIG. 4 is a detail view showing the insert seats 30a-30c in the first to third segments in a common spiral groove 28. As can be seen from FIG. 4, the insert seat 30 is basically constituted by a flat bottom surface 31 that is brought into contact with a lower surface 42 of the later-described cutting insert 40 and two flat side surfaces 32, 33 that are brought into contact with a peripheral side surface 43 of the cutting insert 40. Although, in the present embodiment, these side surfaces and bottom surface have a positional relationship in which virtual planes formed by extending the side surfaces 32 and 33 intersect with a virtual plane formed by extending the bottom surface 31 at an obtuse angle, the positional relationship is not limited thereto, and they may have a positional relationship in which such virtual planes intersect with each other at a right angle or an acute angle. A recessed part 34 is provided between the bottom surface 31 and the side surfaces 32, 33. The bottom surface 31 of the insert seat 30 has generally the same shape as the lower surface 42, serving as a seating surface, of the cutting insert 40 to be mounted. Although the shape of the bottom surface 31 is substantially triangular in the present embodiment, the shape is not limited thereto. A fixture hole 35 for fixing the cutting insert 40 onto the insert seat 30 by screwing is provided at substantially the center of the bottom surface 31. An inner surface of the fixture hole 35 is provided with a thread groove for a female thread. The side surfaces 32 and 33 of the insert seats 30 are constituted by: a first side surface 32 facing the base end side and the peripheral surface side of the tool; and a second side surface 33 facing the leading end side and the peripheral surface side of the tool. In other words, within one insert seat 30, a side surface located closer to the leading end side of the tool is the first side surface 32 and a side surface located closer to the base end side of the tool is the second side surface 33. The first side surface 32 and the second side surface 33 extend by a constant length in a direction parallel to the bottom surface 31 at positions spaced apart from the bottom surface 31 by a constant distance in a direction at right angles. The first side surface 32 and the second side surface 33 have a constant width in a direction intersecting with the bottom surface 31. Although the first side surface 32 and the second side surface 33 oppose each other in a positional relationship in which they intersect with each other at an angle of about 60 degrees in the present embodiment, the configuration is not limited thereto and they may intersect with each other at other angles. The shape and positional relationship of the bottom surface 31 and the side surfaces 32, 33 of the insert seat 30 may be appropriately changed in consideration of the shape of the cutting insert 40 to be mounted, etc.

Figure 5:
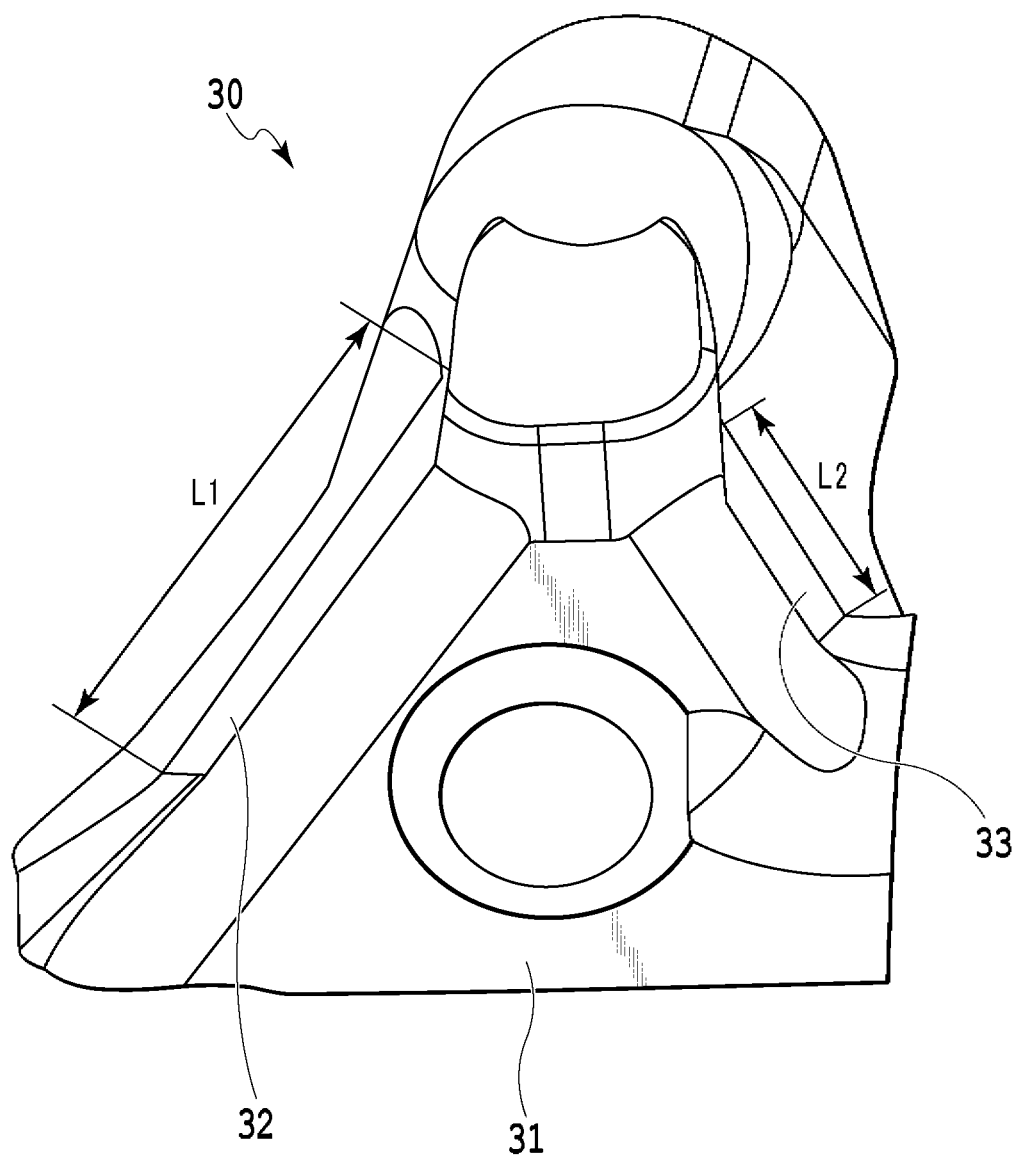
FIG. 5 is an enlarged view showing an insert seat in a second segment.
Figure 6A:
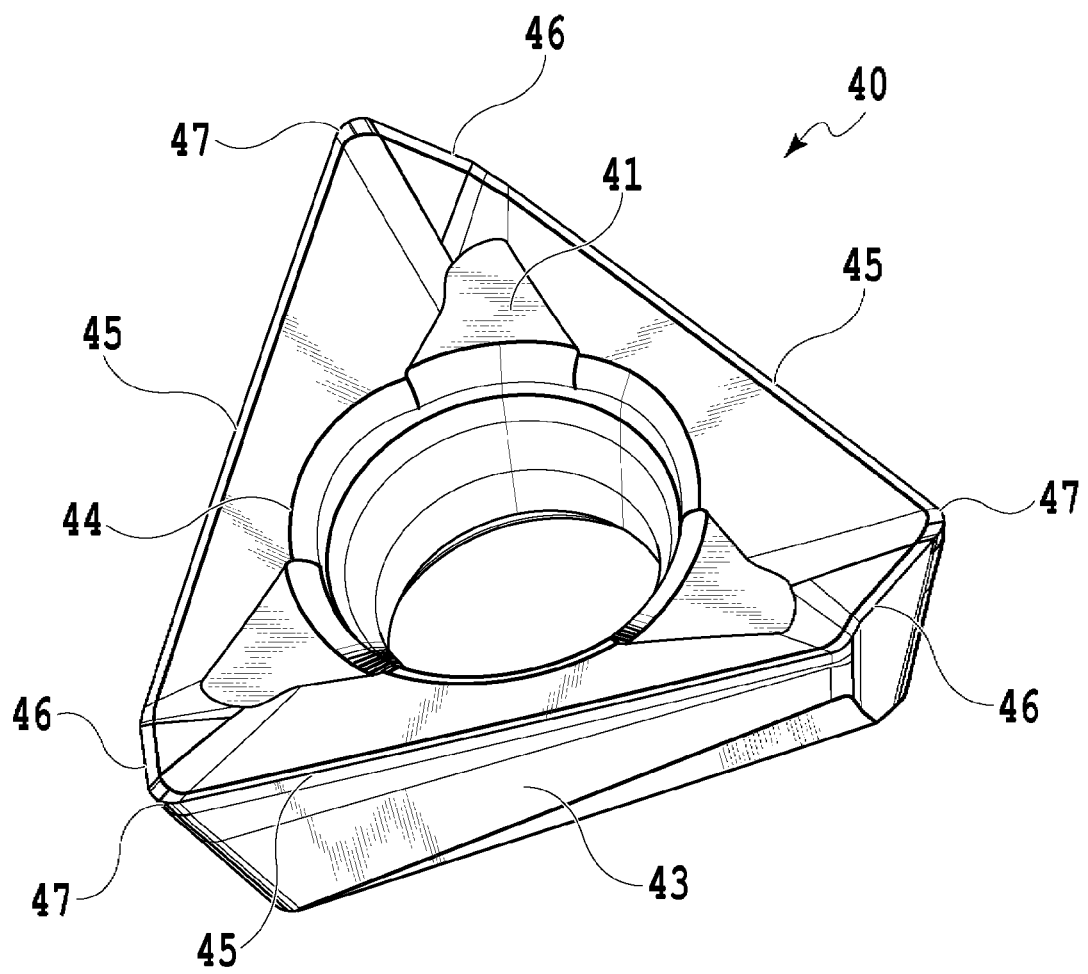
FIG. 6A is a perspective view showing a cutting insert shown in FIG. 1.
Figure 6B:
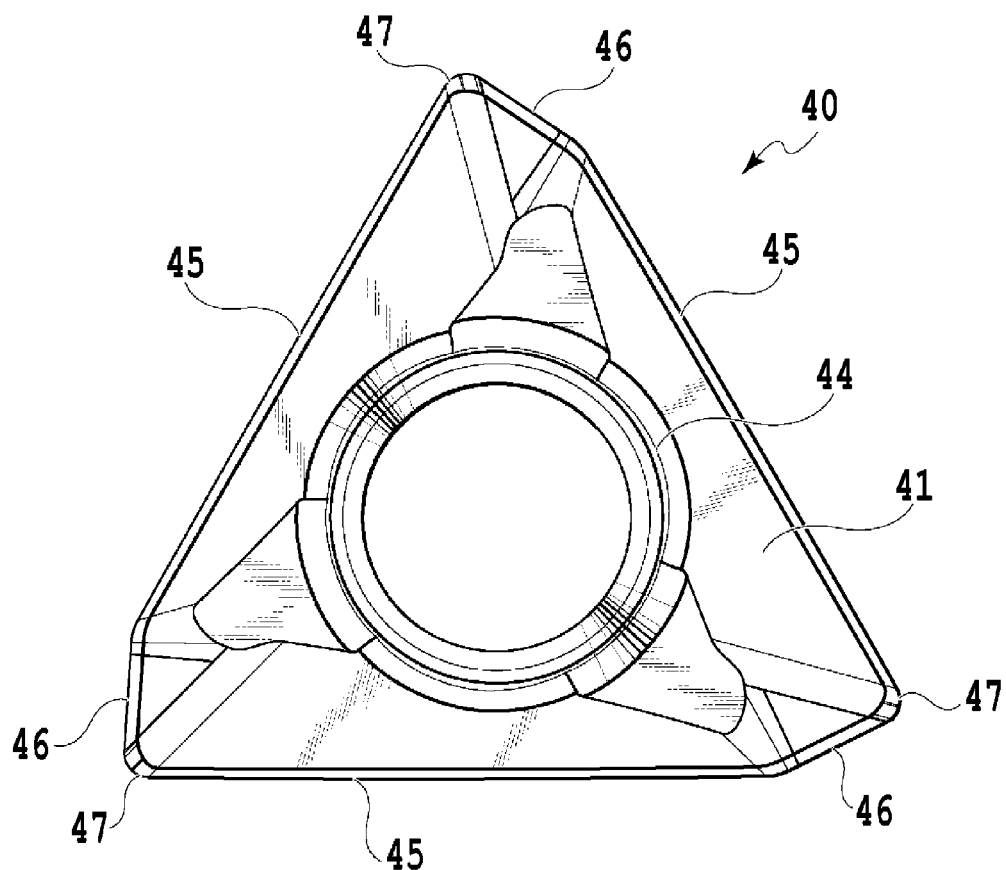
FIG. 6B is a top view showing the cutting insert shown in FIG. 1.
Figure 6C:
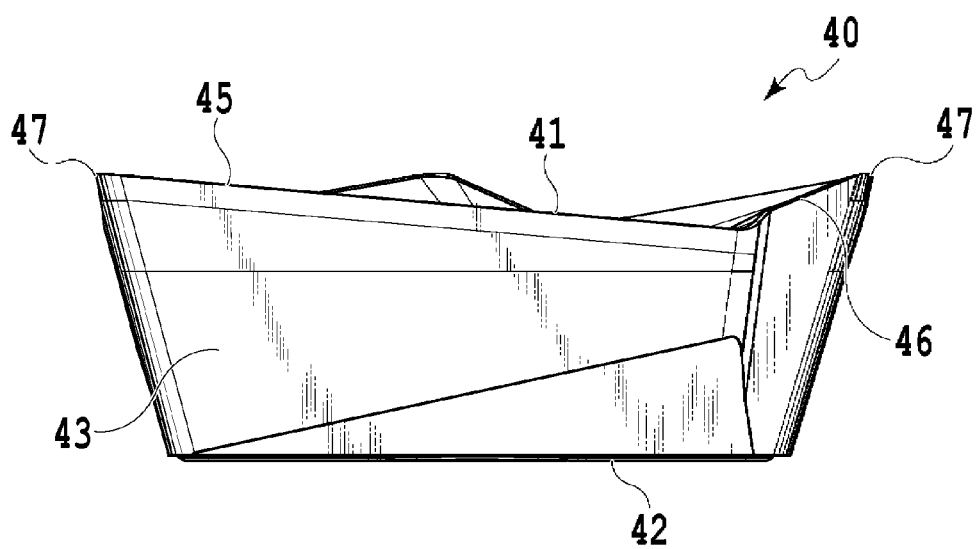
FIG. 6C is a side view showing the cutting insert shown in FIG. 1.
Figure 6D:
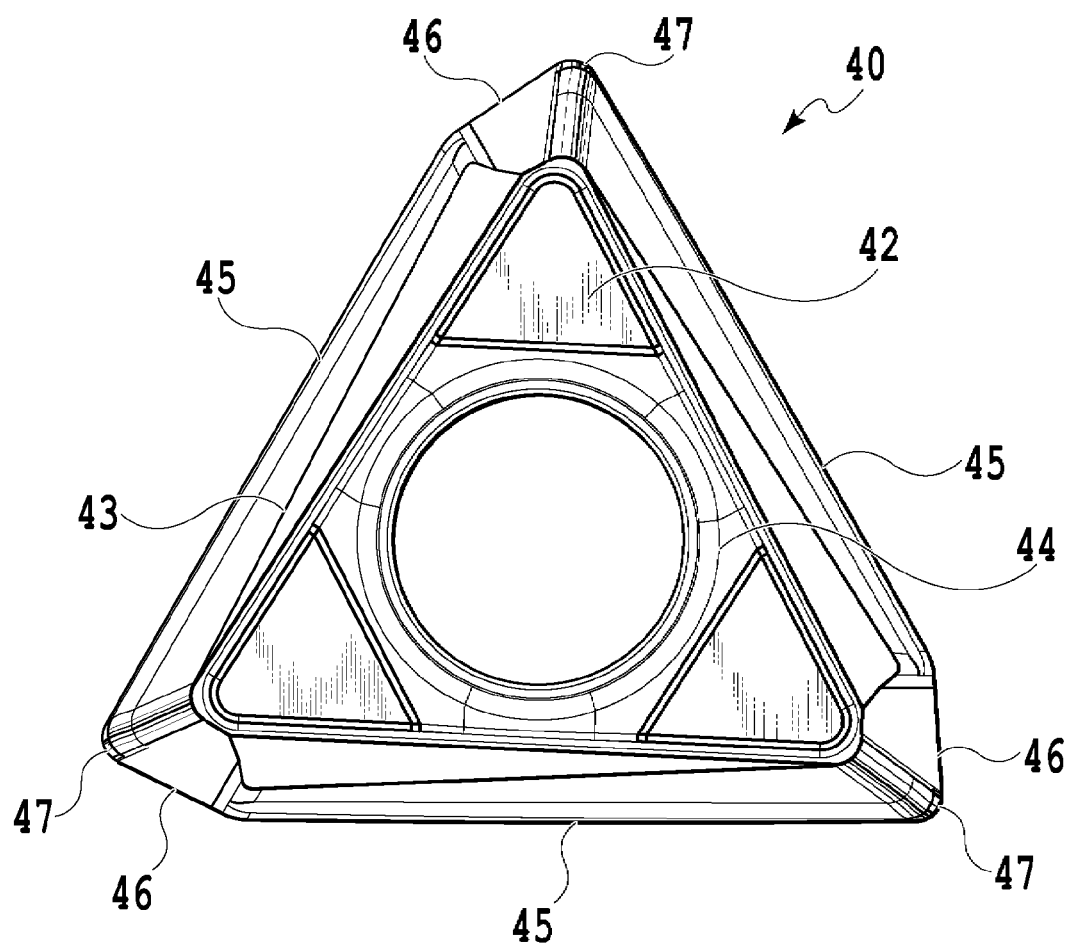
FIG. 6D is a bottom view showing the cutting insert shown in FIG. 1.
Figure 8:
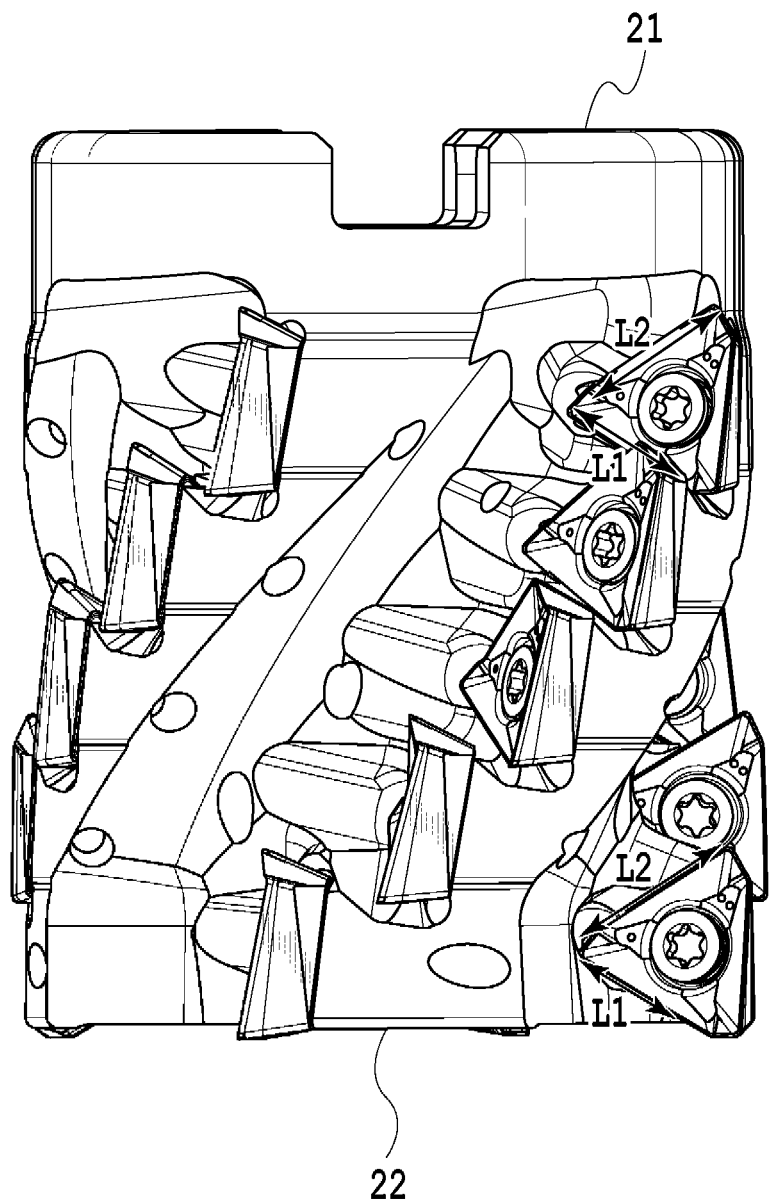
FIG. 8 is a perspective view as viewed from a direction in which an insert seat located closest to a leading end side of the tool body of FIG. 1 appears substantially at the center.
Figure 9:
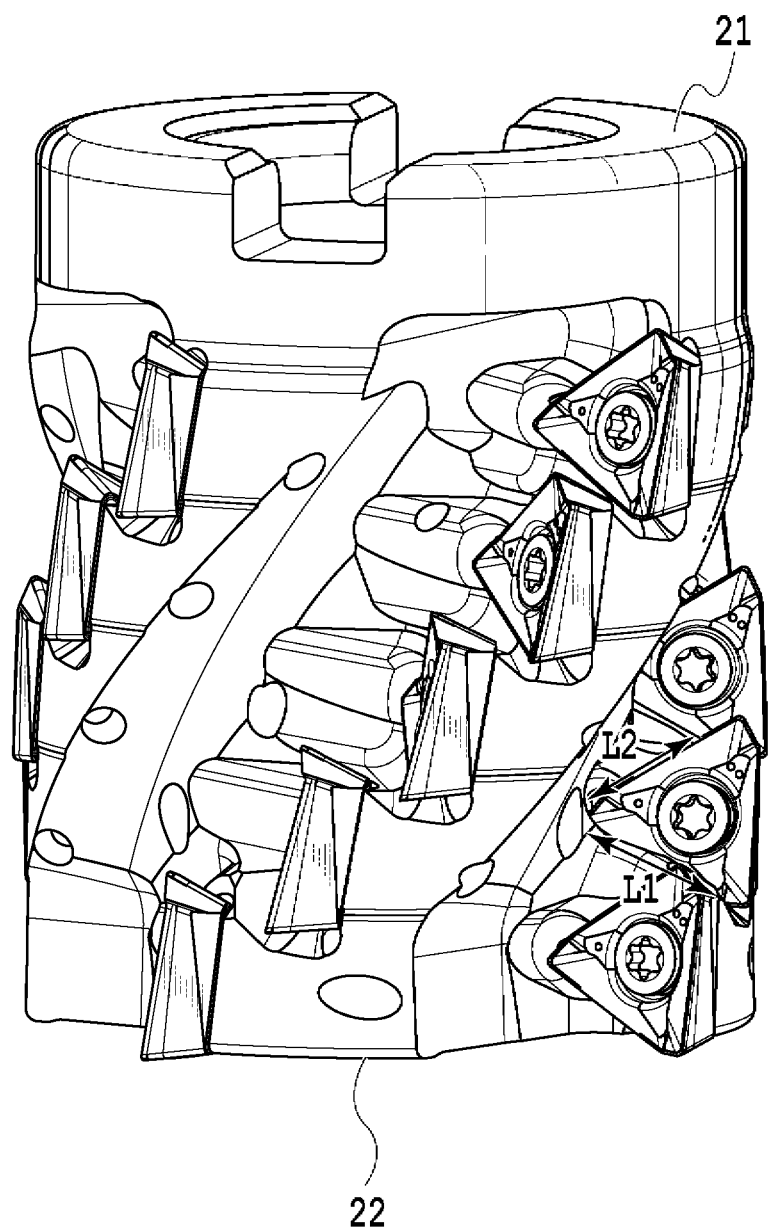
FIG. 9 is a perspective view as viewed from a direction in which an insert seat located in a second segment from the leading end side of the tool body of FIG. 1 appears substantially at the center.
Figure 10:
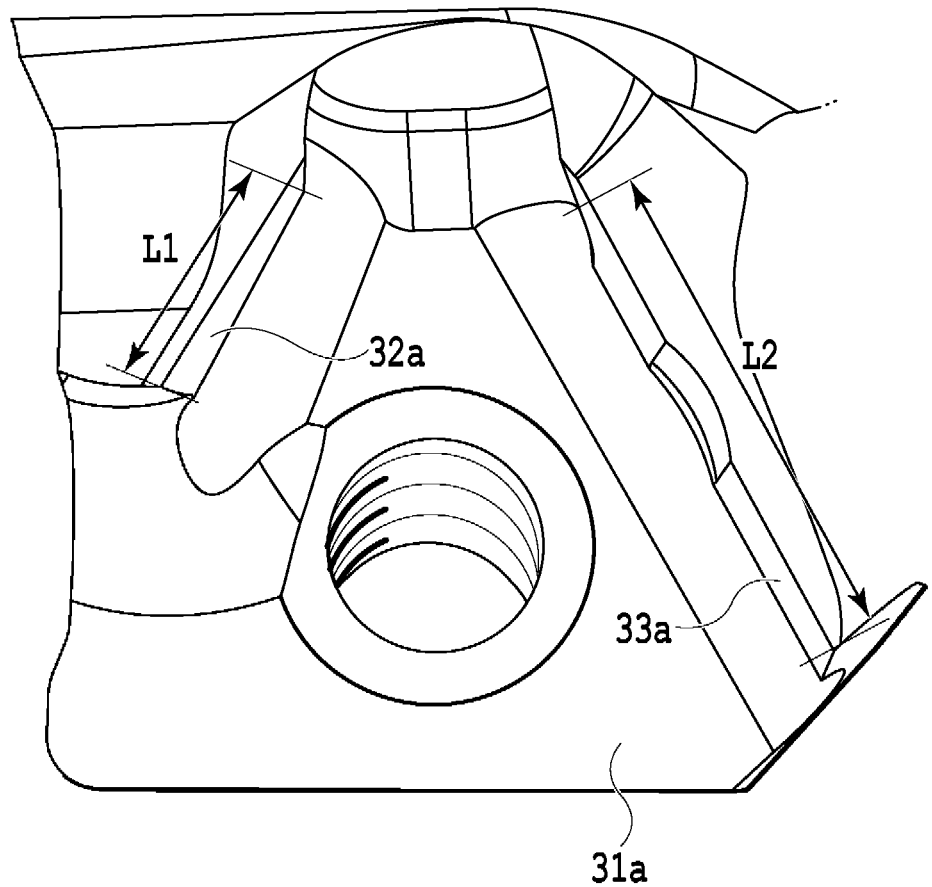
FIG. 10 is an enlarged view showing an inset seat in a first segment.
Figure 11:
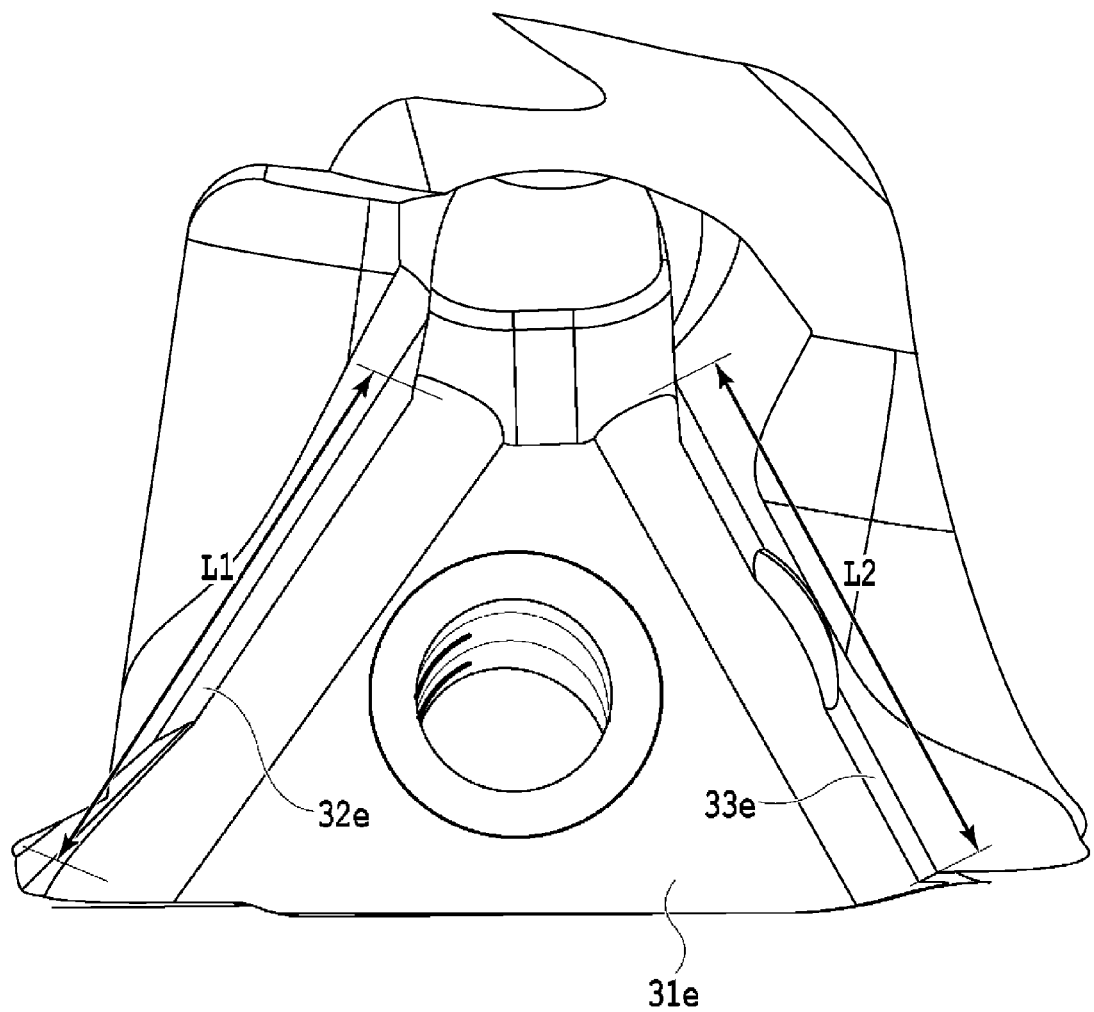
FIG. 11 is an enlarged view showing an insert seat in a fifth segment.

Although the first side surface 32 and the second side surface 33 of the insert seat 30 extend by a constant distance in a direction parallel to the bottom surface 31 at positions spaced apart from the bottom surface 31 by a constant distance in a direction at right angles, as described above, in a specific insert seat, a length L1 of the first side surface 32 and a length L2 of the second side surface 33 are different from each other, as shown in FIG. 5 which shows the insert seat in the second segment in an enlarged manner. In the present embodiment, as shown in FIGS. 4, 8 and 10, the insert seat 30a in the first segment is configured such that, in comparison between the length L1 of the first side surface 32a and the length L2 of the second side surface 33a, the length L2 of the second side surface 33a is longer than the length L1 of the first side surface 32a. On the other hand, as shown in FIGS. 4, 5 and 9, the insert seat 30b in the second segment is configured such that the first length L1 of the first side surface 32b is longer than the length L2 of the second side surface 33b. Similar to the insert seat 30b in the second segment, the insert seats 30c, 30d in the third and fourth segments are also configured such that the length L1 of the first side surfaces 32c, 32d is longer than the length L2 of the second side surfaces 33c, 33d. Regarding the insert seat 30e in the fifth segment, the length of the first side surface 32e and the length of the second side surface 33e are generally equal (see FIGS. 2, 8 and 11).

The cutting insert 40 used in the present embodiment is basically constituted by an upper surface 41 having a substantially triangular shape, the lower surface 42 arranged so as to oppose the upper surface 41 and having a substantially triangular shape, and the peripheral side surface 43 connecting the upper surface 41 and the lower surface 42, as shown in FIGS. 6A-6D. More specifically, it can also be said that, in FIG. 6B, the upper surface 41 has a hexagonal shape formed by long side portions and short side portions alternately intersecting at a substantially right angle or at an obtuse angle. A mounting hole 44 is provided so as to penetrate substantially the center of the upper surface 41 and the lower surface 42. The peripheral side surface 43 forms an acute angle with respect to a plane which is orthogonal to a central axis of the mounting hole 44 and passes edges of the upper surface 41, and is orthogonal to the central axis of the mounting hole 44, and the lower surface 42 and the peripheral side surface 43 form an obtuse angle. Accordingly, this cutting insert 40 is a so-called positive type. At least part of an intersecting edge between the upper surface 41 and the peripheral side surface 43 is provided with cutting edges. Specifically, major cutting edges 45 are formed on long side portions, minor cutting edges 46 are formed on short side portions, and a corner cutting edge 47 is formed on each corner at which the long side portion and the short side portion intersect with each other at a substantially right angle. Accordingly, since the cutting insert 40 of the present embodiment has three sets of a major cutting edge 45, a minor cutting edge 46 and a corner cutting edge 47, a single cutting insert 40 can perform cutting processes three times by sequentially using the sets of cutting edges. However, the shape and configuration of the cutting insert 40 used for the indexable rotary cutting tool 10 according to the present invention are not limited thereto and may be appropriately changed as needed. For example, the contour of the cutting insert 40 may be other polygonal shapes, such as quadrangles and pentagons, and the cutting insert may be of a negative-type in which the peripheral side surface intersects with the upper surface and the lower surface at 90 degrees.

Such cutting insert 40 is mounted on the insert seat 30 of the tool body 20 by a fastening screw 50. At this time, the lower surface 42 of the cutting insert 40 is brought into contact with the bottom surface 31 of the insert seat 30. In addition, the peripheral side surface 43 of the cutting insert 40 is brought into contact with the first side surface 32 and the second side surface 33 of the insert seat 30. At this time, the cutting insert 40 is mounted on the insert seat so as to be arranged in positional relationships in which: an active major cutting edge 45 is parallel to the peripheral surface 23 on the peripheral surface side of the tool body 20; and an active minor cutting edge 46 is parallel to the leading end surface 22 on the leading end surface side of the tool body 20. Once the cutting insert 40 is fixed to the tool body 20 by the fastening screw 50, a screw head is accommodated in the mounting hole 44 of the cutting insert 40. Thus, it is possible to eliminate projections projected in the spiral groove 28, in comparison with a configuration using a wedge, a presser piece, etc. to fix the cutting insert 40. Accordingly, it is possible to secure a substantially flat space with no projection against which chips will collide on the upper surface of the cutting insert 40 and it is therefore possible to enhance the discharging efficiency of chips.

The cutting edges and their peripheral portions of the cutting insert 40 can be made of rigid materials, such as a cemented carbide, cermet, ceramic, a material obtained by applying a coating to these materials, an ultrahigh-pressure sintered body containing diamond or cubic boron nitride, and a material obtained by applying a coating to the ultra-high-pressure sintered body containing cubic boron nitride. The remaining parts other than the cutting edges of the cutting insert 40 are preferably made of similar types of rigid materials.

Figure 7:
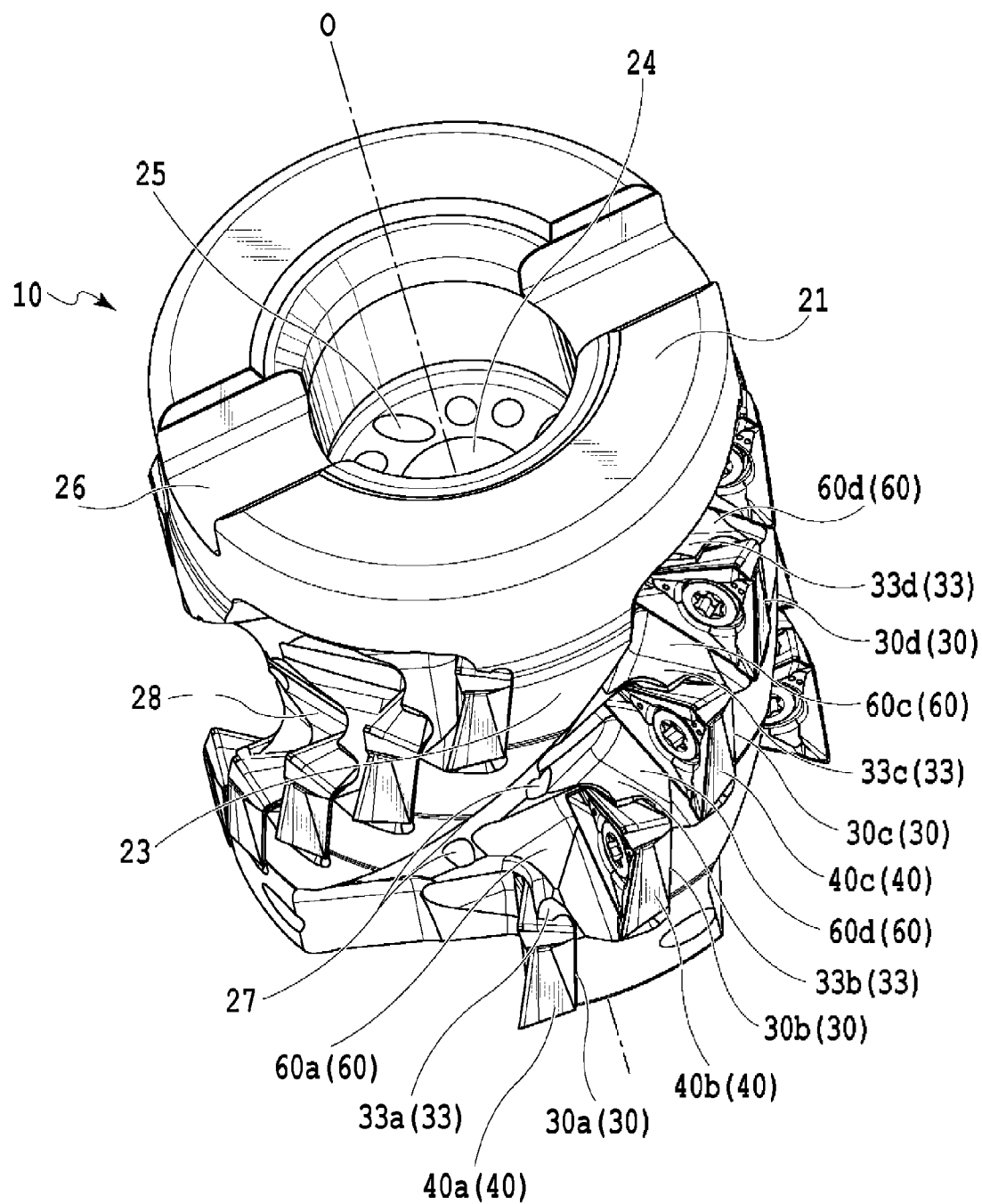
FIG. 7 is a perspective view showing an embodiment of an indexable rotary cutting tool according to the present invention, as viewed from a base end side.

In the present embodiment, five cutting inserts 40 are mounted per spiral groove 28. As shown in FIGS. 1 and 7, in the cutting insert 40a in the first segment arranged closest to the leading end side of the tool, the major cutting edge 45 is involved in the cutting of a side work surface of a workpiece, the active minor cutting edge 46 is involved in the cutting of a bottom work surface of the workpiece and the active corner cutting edge 47 is involved in the cutting of a work corner of the workpiece. On the other hand, in the cutting inserts 40b-40e in the second to fifth segments, the minor cutting edges 46 and the corner cutting edges 47 are not involved in the cutting of the workpiece, although the active major cutting edges 45 are involved in the cutting of the side work surface of the workpiece. In other words, the minor cutting edges 46 and the corner cutting edges 47 of the cutting inserts 40b-40e in the second to fifth segments are arranged so as not to be projected radially outward with respect to a rotational trajectory of the major cutting edge 45 of another cutting inset 40, in particular, of an adjacent cutting insert 40 located closer to the leading end side.

In a side view of the tool body 20, the cutting inserts 40 are arranged so as to overlap in the direction of the rotational axis O in one spiral groove 28. More specifically, the major cutting edges 45 of adjacent cutting inserts 40 in one spiral groove 28 overlap with each other in the direction of the rotational axis O. Since the five insert seats 30 are formed in a stair-like manner in the spiral groove 28, as shown in FIG. 2, the cutting inserts 40 can be arranged in such overlapping manner. With such arrangement of the cutting inserts 40, no area that remains uncut will be produced in the side work surface of the workpiece.

The advantageous effects of the indexable rotary cutting tool 10 according to the present embodiment will now be described.

In the tool body 20 of the indexable roughing end mill 10, the insert seat 30 includes the bottom surface 31 and the first side surface 32 and the second side surface 33 that are formed so as to intersect with the bottom surface 31, the first side surface 32 being located on the leading end side of the tool body 20 and the second side surface 33 being located on the base end side of the tool body 20. In the insert seats in the second to fourth segments from among the five cutting insert seats 30, the length L1 of the first side surface 32 is longer than the length L2 of the second side surface 33, as shown in FIG. 5. Since this configuration eliminates a wall surface that may otherwise become an obstacle in a direction of discharge of the chips which are generated as a result of the cutting process, the discharging efficiency of chips can be significantly increased. For example, when chips are generated by the major cutting edge 45 of the cutting insert 40c in the third segment, the chips enter the spiral groove 28 while curling and are then discharged to the outside of the spiral groove 28. At this time, if the length L2 of the second side surface 33b of the insert seat 30b in the second segment is long, its back metal portion 60b (see FIGS. 4 and 7) is greatly protruded and chips from the cutting insert 40c in the third segment will often collide against an area on a tool peripheral side of the back metal portion 60b. This impedes a natural discharge of the chips to the outside of the spiral groove 28 and the chips are likely to be accumulated in the spiral groove 28. In addition, if unintended deformation, such as bending and collapse, of the chips occurs, the discharging efficiency of the chips will be further decreased. This problem becomes more significant under stricter conditions. On the other hand, the insert seats 30b, 30c, 30d in the second, third and fourth segments in the present embodiment are formed so that the length L2 of the second side surfaces 33b, 33c, 33d is shorter than the length L1 of the first side surfaces 32b, 32c and 32d and the back metal portions 60b, 60c, 60d are thereby prevented from being greatly protruded toward the peripheral surface side. In other words, by forming the length L2 of the second side surface 33b of the insert seat 30b in the second segment so as to be shorter than the length L1 of the first side surface 32b as in the present invention, a wide space is provided between the insert seat 30b in the second segment and the insert seat 30c in the third segment and no obstacle exists. As a result, chips generated by the cutting insert in the third segment will smoothly enter the spiral groove 28 without any obstacle and are discharged to the outside of the spiral groove 28. In addition, since the length L1 of the first side surface 32b is secured so as to be longer than the length L2 of the second side surface 33b, the force for fixing the cutting insert 40 is not significantly reduced and the cutting insert 40 can be supported with sufficient strength. The same applies to the relationship in the third segment and the fourth segment. Regarding the insert seat 30e in the uppermost segment, the second side surface 33e does not become an obstacle to the chips, the length of the first side surface 32e may be longer or the length of the second side surface 33e may be longer. Accordingly, in the present invention, the above-mentioned advantages can be exerted as long as the length L1 of the first side surface 32 is longer than the length L2 of the second side surface 33 in at least one insert seat 30 other than the insert seat in the uppermost segment.

Furthermore, in the present invention, only the insert seat in the first segment, from among the plurality of insert seats 30 arranged in a common spiral groove 28, is preferably formed such that the length L2 of the second side surface 33a is longer than the length L1 of the first side surface 32a (see FIGS. 8 and 10). This is because, since the cutting insert 40 in the first segment performs the cutting of a bottom surface of the workpiece with its minor cutting edge 46, it receives a large cutting resistance (thrust force) in the direction along the rotational axis O of the tool body 20. In order to sufficiently withstand the cutting resistance, the second side surface 33a arranged at the base end side of the tool is preferably formed longer. On the other hand, the minor cutting edges 46 of the cutting insert 40 in the second and subsequent segments are not involved in cutting, and therefore no cutting resistance is applied to these cutting inserts 40 in the direction along the rotational axis O. Thus, the second side surface 33 does not have to be formed longer in the second and subsequent segments.

In addition, from among the plurality of insert seats 30 arranged in a common spiral groove 28, it is preferable for the length L1 of the first side surface 32 to be longer than the length L2 of the second side surface 33 in at least all the segments other than the first segment and the uppermost segment. With such configuration, it is possible to improve the fixing performance for the cutting insert 40 in the first segment as described above, while maximizing the discharging efficiency of chips in the other segments. At this time, it is obvious that the length L1 of the first side surface 32 may be longer than the length L2 of the second side surface 33 in the insert seat 30 in the uppermost segment.

In addition, the present invention exerts a particularly significant effect in the configuration in which the insert seats 30 are formed in a stair-like manner in the spiral groove 28. This is because adjacent cutting inserts 40 are arranged so as to overlap in the direction of the rotational axis O of the tool body 20 in a common spiral groove 28 in this configuration, and if such configuration is not provided, the second side surface 33 of an insert seat located in the front segment, i.e., in the insert seat located on the leading end side, is protruded toward the leading end side of the tool with respect to the cutting insert 40 on the adjacent insert seat in the rear segment, i.e., the insert seat located on a rear end side, and such second side surface 33 becomes a significant obstacle to the discharge of the chips.

It should be noted that the present invention is not limited to the configurations described as examples in the above-mentioned embodiments. For example, the present invention is also applicable to a roughing end mill in which segments can be separated from one another or to a roughing end mill integrated with an arbor.

Representative embodiments of the present invention have been described above. However, various changes can be made to the present invention and substitutions and changes can be made to the present invention without departing from the spirit and scope of the present invention defined in the scope of the claims in the present application.

What is claimed is:

1. A substantially cylindrical tool body (20) having a rotational axis (O), the tool body (20) comprising:
   a spiral groove (28) formed so as to extend from a base end side of the tool body to a leading end side in a peripheral surface (23) of the tool body (20); and
   a plurality of insert seats (30) formed so as to be shifted from each other from the base end side toward the leading end side along the spiral groove,
   wherein the insert seats (30) each comprise a bottom surface (31), a first side surface (32) that intersects with the bottom surface (31) and faces the base end side of the tool body (20), and a second side surface (33) that intersects with the bottom surface and faces the leading end side of the tool body (20), the second side surface (33) being located on the base end side with respect to the first side surface (32),
   wherein, in at least one insert seat (30) located closer to the base end side with respect to an insert seat (30) located closest to the leading end side of the tool body (20), a length (L1) of the first side surface (32) is longer than a length (L2) of the second side surface (33), and
   wherein, in the insert seat (30) located closest to the leading end side of the tool body, the length (L2) of the second side surface (33) is longer than the length (L1) of the first side surface (32).

2. The tool body (20) according to claim 1, comprising a plurality of the spiral grooves (28).

3. A substantially cylindrical tool body (20) having a rotational axis (O), the tool body (20) comprising:
   a spiral groove (28) formed so as to extend from a base end side of the tool body to a leading end side in a peripheral surface (23) of the tool body (20); and
   a plurality of insert seats (30) formed so as to be shifted from each other from the base end side toward the leading end side along the spiral groove, wherein:
   the insert seats (30) each comprise a bottom surface (31), a first side surface (32) that intersects with the bottom surface (31) and faces the base end side of the tool body (20), and a second side surface (33) that intersects with the bottom surface and faces the leading end side of the tool body (20), the second side surface (33) being located on the base end side with respect to the first side surface (32),
   in at least one insert seat (30) located closer to the base end side with respect to an insert seat (30) located closest to the leading end side of the tool body (20), a length (L1) of the first side surface (32) is longer than a length (L2) of the second side surface (33), and
   from among the plurality of insert seats (30) in a common spiral groove (28), in at least all the insert seats (30) other than the insert seat (30) located closest to the leading end side and an insert seat (30) located closest to the base end side, the length (L1) of the first side surface (32) is longer than the length (L2) of the second side surface (33).

4. The tool body (20) according claim 1, wherein the plurality of insert seats (30) is formed in a stair-like manner in the spiral groove (28).

5. The tool body (20) according to claim 4, wherein a rotational trajectory around the rotational axis of the bottom surface of one insert seat partially overlaps an insert seat adjacent to said one insert seat.

6. The tool body (20) according to claim 1, wherein the bottom surface (31) has a substantially triangular shape.

7. An indexable rotary cutting tool (10), comprising:
   a substantially cylindrical tool body (20) having a rotational axis (0), the tool body (20) comprising:
     a spiral groove (28) formed so as to extend from a base end side of the tool body to a leading end side in a peripheral surface (23) of the tool body (20); and
     a plurality of insert seats (30) formed so as to be shifted from each other from the base end side toward the leading end side along the spiral groove, wherein:
     the insert seats (30) each comprise a bottom surface (31), a first side surface (32) that intersects with the bottom surface (31) and faces the base end side of the tool body (20), and a second side surface (33) that intersects with the bottom surface and faces the leading end side of the tool body (20), the second side surface (33) being located on the base end side with respect to the first side surface (32), and
     in at least one insert seat (30) located closer to the base end side with respect to an insert seat (30) located closest to the leading end side of the tool body (20), a length (L1) of the first side surface (32) is longer than a length (L2) of the second side surface (33), wherein:
       the bottom surface (31) has a substantially triangular shape; and
       the first side surface (32) and the second side surface (33) intersect each other at an angle of 60 degrees; and
   cutting inserts (40) removably mounted on the insert seats (30) of the tool body (20), wherein the cutting inserts are triangular in shape.

8. A substantially cylindrical tool body (20) having a rotational axis (O), the tool body (20) comprising:
   a spiral groove (28) formed so as to extend from a base end side of the tool body to a leading end side in a peripheral surface (23) of the tool body (20); and
   a plurality of insert seats (30) formed so as to be shifted from each other from the base end side toward the leading end side along the spiral groove, wherein:
   the insert seats (30) each comprise a bottom surface (31), a first side surface (32) that intersects with the bottom surface (31) and faces the base end side of the tool body (20), and a second side surface (33) that intersects with the bottom surface and faces the leading end side of the tool body (20), the second side surface (33) being located on the base end side with respect to the first side surface (32),
   in at least one insert seat (30) located closer to the base end side with respect to an insert seat (30) located closest to the leading end side of the tool body (20), a length (L1) of the first side surface (32) is longer than a length (L2) of the second side surface (33),
   in the at least one insert seat (30) located closer to the base end side, the length (L1) of the first side surface (32) is at least twice as long as length (L2) of the second side surface (33), and
   in the insert seat (30) located closest to the leading end side of the tool body, the length (L2) of the second side surface (33) is at least twice as long as the length (L1) of the first side surface (32).

9. The tool body (20) according to claim 1, wherein:
   in the insert seat (30) located closest to the leading end side of the tool body, the length (L2) of the second side surface (33) is at least twice as long as the length (L1) of the first side surface (32).

10. The tool body (20) according to claim 1, wherein:
in at least all the insert seats (30) other than the insert seat (30) located closest to the leading end side and an insert seat (30) located closest to the base end side, the length (L1) of the first side surface (32) is longer than the length (L2) of the second side surface (33).

11. The tool body (20) according to claim 10, wherein:
the plurality of insert seats (30) is formed in a stair-like manner in the spiral groove (28).

12. The tool body (20) according to claim 11, wherein a rotational trajectory around the rotational axis of the bottom surface of one insert seat partially overlaps an insert seat adjacent to said one insert seat.

13. The tool body (20) according to claim 12, wherein:
the bottom surface (31) has a substantially triangular shape; and
the first side surface (32) and the second side surface (33) intersect each other at an angle of 60 degrees.

14. The tool body (20) according to claim 13, comprising a plurality of the spiral grooves (28).

15. The tool body (20) according to claim 10, wherein:
the bottom surface (31) has a substantially triangular shape; and
the first side surface (32) and the second side surface (33) intersect each other at an angle of 60 degrees.

16. The tool body (20) according to claim 15, comprising a plurality of the spiral grooves (28).

17. The tool body (20) according to claim 10, comprising a plurality of the spiral grooves (28).

* * * * *